United States Patent [19]

Terashita

[11] Patent Number: 4,984,013
[45] Date of Patent: Jan. 8, 1991

[54] METHOD FOR CONTROLLING EXPOSURE AMOUNT IN COPYING OF COLOR ORIGINALS

[75] Inventor: Takaaki Terashita, Ashigarakami, Japan

[73] Assignee: Fuji Photo Film Co., Ltd., Kanagawa, Japan

[21] Appl. No.: 511,810

[22] Filed: Apr. 17, 1990

Related U.S. Application Data

[63] Continuation of Ser. No. 343,710, Apr. 27, 1989, abandoned.

[30] Foreign Application Priority Data

| Apr. 28, 1988 | [JP] | Japan | 63-107105 |
| May 13, 1988 | [JP] | Japan | 63-117199 |
| May 13, 1988 | [JP] | Japan | 63-117200 |
| May 19, 1988 | [JP] | Japan | 63-122762 |
| May 19, 1988 | [JP] | Japan | 63-122763 |

[51] Int. Cl.$^5$ .................................. G03B 27/80
[52] U.S. Cl. .................................. 355/38; 355/77
[58] Field of Search .................. 355/38, 68, 77

[56] References Cited

U.S. PATENT DOCUMENTS

| 3,677,641 | 7/1972 | King et al. | 355/68 X |
| 3,888,580 | 6/1975 | Amano | 355/38 |
| 4,641,959 | 2/1987 | Terashita | 355/38 X |
| 4,668,082 | 5/1987 | Terashita | 355/68 X |
| 4,693,596 | 9/1987 | Shigaki | 355/68 X |
| 4,769,695 | 9/1988 | Terashita | 355/38 X |
| 4,816,874 | 3/1989 | Terashita et al. | 355/38 |

Primary Examiner—L. T. Hix
Assistant Examiner—D. Rutledge
Attorney, Agent, or Firm—Sughrue, Mion, Zinn, Macpeak & Seas

[57] ABSTRACT

Prior to copying of a color original, the original is scanned for photometric measurement in order to determine an optimum exposure amount for copying. The exposure amount in copying of a color original is controlled by (a) photometrically measuring a color density on the surface of the original, (b) determining whether or not the difference in color density between two positionally different spots exceeds a predetermined value, thereby determining whether the spots belong to an image region or a background region and extracting at least one of the regions, and (c) determining an exposure amount for subsequent copying based on a characteristic quantity of the extracted region.

11 Claims, 10 Drawing Sheets

METHOD FOR CONTROLLING EXPOSURE AMOUNT IN COPYING OF COLOR ORIGINALS

This is a continuation of application Ser. No. 07/343,710 filed Apr. 27, 1989 abandoned.

This invention relates to a method for controlling an exposure amount in copying of color originals. The method is applicable to color image copying machines including silver salt photographic color copying machines or optical printers, electrophotographic color copying machines, and laser color copying machines.

BACKGROUND OF THE INVENTION

A silver salt photographic color copying machine is used to make a color copy from a color original. It is, of course, desired to reproduce an image having a density corresponding to the original in good faith. A key is how to reproduce a density and other factors in as close agreement with the original as possible.

A typical prior art copying method is designed such that prior to actual copying, photometric measurement is carried out on the surface of the original to read various types of density necessary to reproduce a proper image, and an optimum exposure amount for copying is determined from such read data.

The types of density read include a density of the original's background (non-image portion), maximum density, minimum density, average density, contrast, an intermediate or weighted average between maximum and minimum densities, a peak density in a histogram, an average of densities appearing at a certain frequency or higher in a histogram, or the like. The thus read density value about the original is utilized in reproducing an image of the original. Several typical methods are described below.

(1) Japanese Patent Application Kokai No. 60-10267 discloses a method comprising previously storing a nonlinear characteristic curve indicative of the relationship of original density to illuminant quantity (exposure) in an exposure computing means, selecting three original densities corresponding to true black, true white and an intermediate density on the basis of the difference in density of the original, and correcting the illuminant quantity each time when the original is copied.

(2) Japanese Patent Application Kokai No. 59-13232 discloses to tailor copying process conditions such that a copy of thinner color may be produced from an original of a deeper color or with a deeper color background and vice verse.

(3) Japanese Patent Application Kokai No. 59-15264 discloses to classify the composition of an original in terms of maximum and minimum densities appearing at a certain frequency or higher in a density histogram and to reproduce an image in accordance with the classification.

(4) Japanese Patent Application Kokai Nos. 54-92742 and 58-113949 disclose an electrophotographic apparatus wherein an image is reproduced by controlling a bias potential in terms of the type of original and modifying the $\gamma$ or gradient of a copy image.

(5) Japanese Patent Application Kokai No. 60-178469 discloses a method for reproducing a copy image by manually setting previously classified reproducible types of original, applying a basic characteristic curve corresponding to a particular type of original to be copied, variably controlling exposure or developing conditions for each type of original, and varying the contrast for each type of original.

(6) Japanese Patent Application Kokai No. 60-22135 discloses to reproduce an image by previously determining classes of an original on the basis of the contrast between an original background and a character pattern and allocating an original to be copied to any one of the classes.

(7) Japanese Patent Application Kokai Nos. 60-112068 and 58-184160 disclose to utilize a minimum density, maximum density or intermediate therebetween of an original to determine an exposure for copying such that an image is reproduced in as close agreement with the original as possible.

It is also known to select a density of the highest frequency in a density histogram of an original or a subject to be copied as an image density. An exposure is computed using the selected density.

When it is desired to reproduce an image having a density with fidelity to an original, there are many factors to be considered, including not only the above-mentioned photometrically measured density and exposure, but also problems occurring on the copying and developing apparatus sides, for example, a variation and a performance lowering due to a change with time of a copying optical system, a variation in characteristics and a lowering in characteristics due to a change with time of a photosensitive material and developing material which are image-forming materials, and a variation in developing conditions.

In general, originals which are contemplated to be copied in these prior art methods bear a two-gradation image (black-and-white image) or an image with a lesser number of gradations as in the case of originals with a black-and-white pattern, character originals, and illustrated originals. In copying, it is only required to reproduce a white area or background at proper white density and characters and black-and-white patterns at proper blackness.

Although the prior art methods are effective in reproducing a two-gradation image or an image with a lesser number of gradations, they are not necessarily effective in reproducing a multi-gradation image as typified by a color image. This is because the multi-gradation image to be reproduced herein has a complex profile of gradation and a slight difference in density between gradations.

For example, one prior art method for reproducing an image utilizes the information about an original including maximum and minimum densities. An exposure is determined from the maximum density corresponding to the density of characters and the minimum density corresponding to the density of background areas. When applied to a multi-gradation color image, this prior art method fails to properly reproduce most areas of intermediate density. As to the other prior art method utilizing a peak density in a histogram, a background area is moderately reproduced so as to finish the remaining image area properly, or character areas are reproduced to a proper density so as to finish the background area to adequate whiteness. Since this method relies on the principle that the character density has an approximately constant difference to the background density irrespective of the identity of original, it is not applicable to multi-gradation images.

Selection of density values by these prior art methods after reading the density of an original is effective insofar as black-and-white images are to be reproduced.

Such selection is inadequate when it is desired to reproduce multi-gradation images such as color originals with fidelity.

The above-mentioned problems occurring on the copying and developing apparatus sides occur to different extents even among apparatus of the same type. To avoid any influence by such phenomenon, each apparatus must be given a particular set of copying conditions. In addition, a provision is also necessary for accommodating a change of γ characteristic of a copying or photosensitive material.

The prior art method utilizing the information of minimum density also has a problem. An original to be copied often has a smaller area than the surface of a table of the apparatus on which the original is rested or the area of photometric measurement. Sometimes, the original is not rested on the table in place. In such cases, light irradiated for scanning of the surface of the original can be transmitted by the area of the table outside the original, reflected by a white surface of the retainer plate, and then directly passed to photometric measuring means. The measurement of image density is thus largely affected, resulting in a markedly lowered accuracy of measurement.

The other prior art method utilizing the information of maximum density raises a problem when it is desired to make a copy from an original in the form of a voluminous book. The book is rested on the table with necessary pages open to the table surface. Within the region which would otherwise essentially belong to the region of the original, large gaps are defined between the pages and outside the perimeter of the book. Upon copying, scanning light irradiated toward the original is transmitted by those areas of the table corresponding to the gaps. A part where no or little reflected light is available is thus created in the original's region where reflection of light is predicted over its entire area. When such a phenomenon occurs, a density having an extremely high value is photometrically measured on the original, causing the precision of measurement to lower. This phenomenon often occurs when three-dimensional articles such as packages and commercial items are to be copied.

Most prior art methods have not taken into account these problems. A few methods give consideration in these respects, but are still unsuccessful.

SUMMARY OF THE INVENTION

An object of the present invention is to eliminate the drawbacks of the prior art methods and to provide a novel and improved method for controlling an exposure amount in copying of color originals.

According to the present invention, there is provided a method for controlling an exposure amount in copying of a color original, comprising the steps of:

(a) photometrically measuring a color density or another value corresponding thereto on the surface of the original, (b) determining whether or not the difference in color density between two positionally different spots exceeds a predetermined value, thereby determining whether the spots belong to an image region or a background region and extracting at least one of the regions, and (c) determining an exposure amount for subsequent copying based on a characteristic quantity of the extracted region.

Preferably, steps (a) and (b) include scanning the surface of the original with light through a slit to continuously measure the density of a series of scanning spots, and determining whether or not the difference in color density between every two adjoining scanning spots exceeds a predetermined value, thereby determining whether the respective spots belong to an image region or a background region.

According to the color original copying exposure controlling method, scanning is carried out on the surface of the color original to photometrically measure a density value or a value corresponding thereto prior to copying operation. Preferably, image reproducing data are previously taken and reproduction density control data are previously set. The density of the color original is photometrically measured. The difference in color density or chromaticity between two positionally different scanning spots is utilized to extract at least one of the image and background regions. The optimum exposure amount for copying is determined by computing a characteristic quantity of the extracted region from the photometric density measurement thereof and combining the quantity with the image reproducing data and the reproduction density control data.

The present invention also provides a method for controlling an exposure amount in copying of a color original, comprising the steps of:

(a) photometrically measuring a color density or another value corresponding thereto on the surface of the original, (b) selecting ranges of low and high level measurements from the measurements, thereby determining an image region or a background region and extracting at least one of the regions, and (c) determining an exposure amount for subsequent copying based on a characteristic quantity of the extracted region.

According to the color original copying exposure controlling method, those photometric density measurements of extremely high and low levels are excluded from the photometric density measurements obtained over the original surface which are used as computing elements upon determining the optimum exposure amount for copying.

BRIEF DESCRIPTION OF THE DRAWINGS

The above and other objects, features, and advantages of the present invention will be better understood from the following description taken in conjunction with the accompanying drawings, in which.

DESCRIPTION OF PREFERRED EMBODIMENTS

The color image copying method of the present invention includes three stages, a stage for discrimination between image and background regions, a stage for determining a characteristic quantity of the image or background region, and a stage for determining an optimum exposure for copying. These stages are described in this order.

STAGE FOR DISCRIMINATION BETWEEN IMAGE AND BACKGROUND REGIONS

Method A

The discrimination stage is to classify the surface of an original or copying subject into an image region and a background region (or background image region). The image region is a region where a picture containing relatively much information is present, that is, a region having a complex profile of color densities. The background region is a region where a picture containing relatively less information is present, that is, a region having a simple profile of color densities. The stage involves steps of carrying out photometric measurement at a series of positionally different spots on the original surface and determining the difference in color density between every two positionally different spots (areas or points), thereby determining whether the respective spots belong to the image or background region.

A color original with a common composition generally contains an image region where a picture is present and a background region. A change in density between scanning spots or picture elements in the image region is larger than that in the background region. When photometric measurement is made on a series of spots in the respective regions, the difference in measured density between spots frequently appears in a range of relatively large density differences for the image region, and the difference in measured density between spots frequently appears in a range of relatively small density differences for the background region.

The original surface is continuously scanned with light through a slit to photometrically measure the density of a series of spots. Two areas whose density measurements are relatively largely different appear in proximity to the boundary between the image and background regions. The change in density measurement between a series of spots is small for the background region, but large for the image region.

Figure 1A:
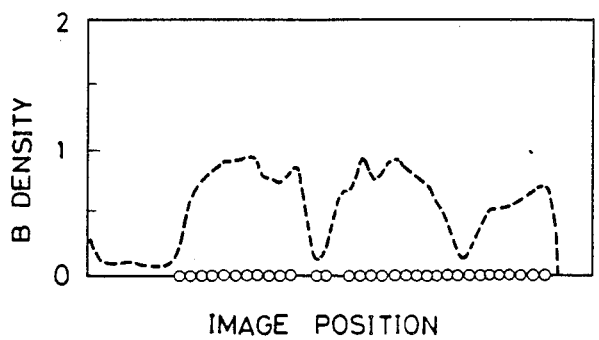
FIGS. 1A, 1B, and 1C are diagrams illustrating how to discriminate between image and background regions in the practice of the method of the present invention, corresponding to an original having a density distribution varying at a relatively high density level, and showing density distribution curves of blue, green and red colors, respectively.
Figure 1B:
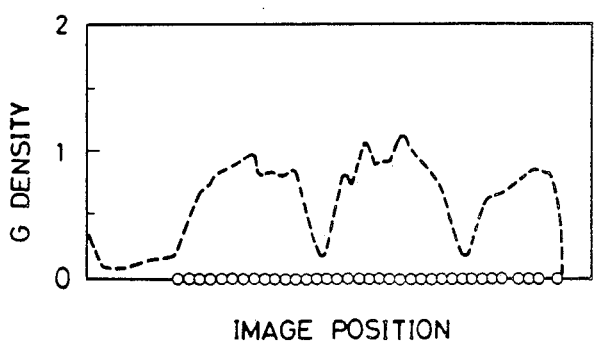
Figure 1C:
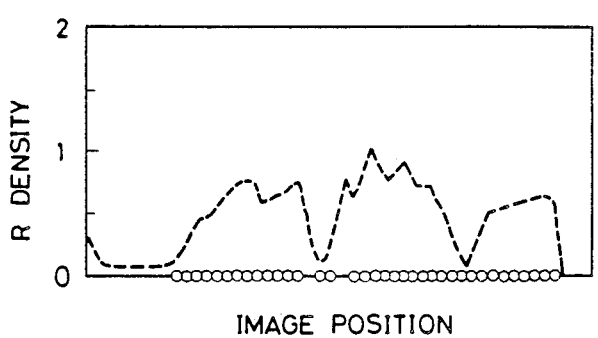
Figure 2A:
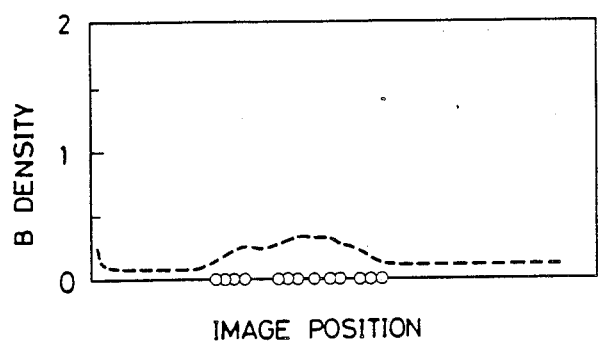
FIGS. 2A, 2B, and 2C are diagrams illustrating how to discriminate between image and background regions in the practice of the method of the present invention, corresponding to an original having a density distribution varying at a relatively low density level, and showing density distribution curves of blue, green and red colors, respectively.
Figure 2B:
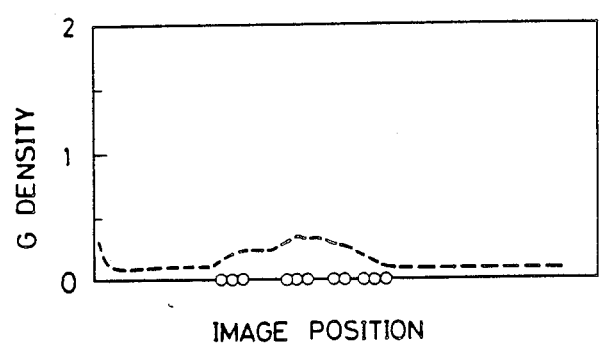
Figure 2C:
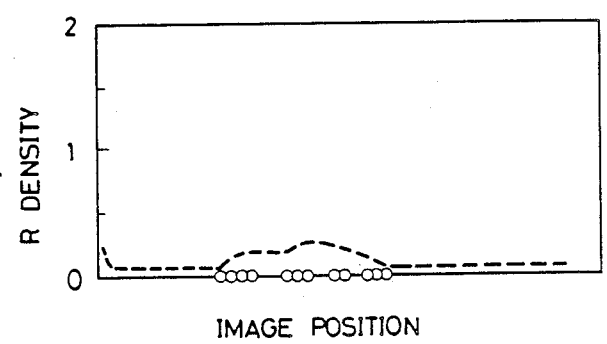

This phenomenon may be graphically illustrated as the relationship of the position of a series of spots in a scanning direction to the density of spots, obtaining FIGS. 1A to 1C for the image region and FIGS. 2A to 2C for the background region.

FIGS. 1A to 1C shows the density-to-position relationship of a series of spots from an original having a density distribution which varies in a relatively high density level range. FIGS. 2A to 2C shows the density-to-position relationship of a series of spots from an original having a density distribution which varies in a relatively low density level range. More specifically, FIGS. 1A, 1B and 1C and FIGS. 2A, 2B and 2C are density distribution curves showing the change of density of blue B, green G and red R colors in the scanning direction, respectively.

Circle marks on the abscissa indicate that the change between the density measurements of adjoining photometric measurement spots is at least 0.01 for either of the three colors.

As evident from these figures, density measurements vary over a relatively wide range in the image region.

Provided that $Dl,k$ and $Dl+p,k+q$ designate densities at two photometric measurement spots having different positions $l$ and $l+p$ in a scanning direction and positions $k$ and $k+q$ in a direction perpendicular to the scanning direction, the difference $\Delta Dl,k$ in density measurement between the two spots is given by the equation:

$$\Delta Dl,k = |Dl,k - Dl+p,k+q|$$

In the equation, $l$ is the position in the direction of axis X, $k$ is the position in the direction of axis Y, and $p$ and $q$ are positive integers or equal to zero and generally, $p=q=1$ or $p=1$, $q=0$. This equation can be used for discrimination between the image and background regions. Every two spots, especially every adjoining spots may be determined to belong to the image region when $\Delta Dl,k > 0.01$, for example.

On practical application of this equation, arithmetic calculation should preferably be made for at least one color as shown in the figures. More specifically, every two spots are determined to belong to the image region when $\Delta Dl,k > w$ for at least one color, wherein w is a constant or a variable dependent on $Dl,k$, and is preferably a constant of 0.01 to 0.06.

Alternatively, the densities $Dl,k$ may be fixed as a reference corresponding to the perimeter of an original support table (for example, the density at the start or end of scanning or an average density in proximity thereto). Then spots whose difference in density from the reference is small (for example, <0.04) are considered to belong to the background region and the remaining spots belong to the image region.

All regions but the regions whose difference in density from the reference is small may be considered the image region. The image region may be determined by combining this second method with the first mentioned method by which a region exhibiting a large difference in density measurement between adjoining spots is considered the image region.

In determining the image region, (a) a region left after those regions determined to be white (for example, Dl,k<0.05) and/or black (for example, Dl,k>2.0) are previously excluded (see Method B described later) and (b) a particular color region may be used as an additional condition, with the advantage of avoiding occurrence of unnecessary noise.

Figure 3A:
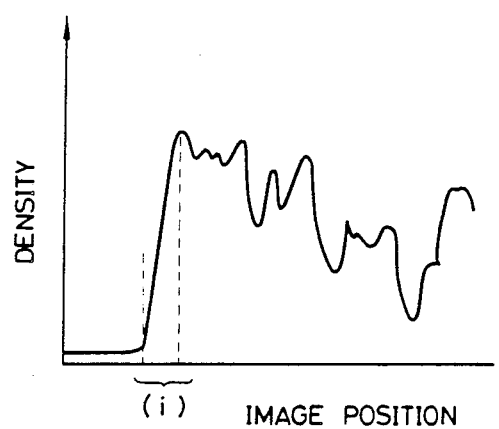
FIGS. 3A and 3B are diagrams showing density distribution curves containing a rejectable density region.
Figure 3B:
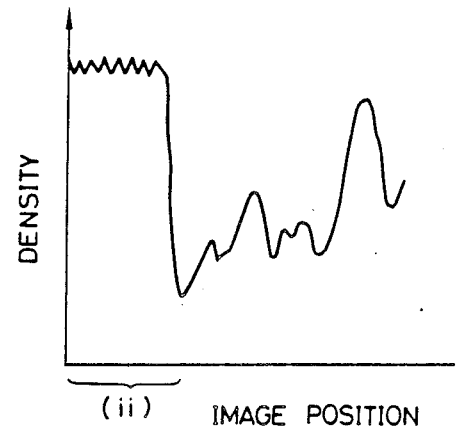

If the photometric measurement spot is small, a region which seems to create no problem when rejected may be positively considered as a rejectable or excludable density region. More specifically, a pseudo-image density region given by the photometric measurement as belonging to neither an image nor a background region, for example, (c) a region of rapidly changing density as shown by region (i) in FIG. 3A or (d) a region of high density as shown by region (ii) in FIG. 3B, may be considered as a rejectable density region.

Alternatively, the present method may depend on chromaticity difference instead of density difference in making discrimination between the image and background regions. For example, provided that $\Delta C$ is a chromaticity difference corresponding to $\Delta Dl,k$, and R, G, B and R', G', B' are photometrically measured densities of red, green and blue colors at two scanning spots, respectively, the chromaticity difference $\Delta C$ is given by the following equation:

$$\Delta C = |[|R-G|+|G-B|]-[|R'-G'|+|G'-B'|]|.$$

or $$\Delta C = |R-R'|+|G-G'|+|B-B'|.$$

This equation can be used for discrimination between the image and background regions. It is to be understood that other methods are available for determining a chromaticity difference and the above-mentioned method is not limiting. Instead of chromaticity difference, a difference in hue or saturation may be used for the discrimination purpose. All these methods are mere alternatives of the first-described method.

Figure 4:
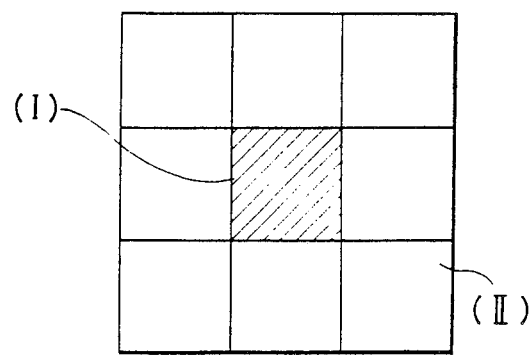
FIG. 4 illustrates another embodiment of discrimination between image and background regions.

Although a change in density or chromaticity is generally measured in a scanning direction during photometric scanning, it is possible to carry out photometric measurement such that the original surface area subject to photometric measurement is divided into a plurality of areas as shown in FIG. 4. Then the difference in density or chromaticity between a central area (I) and a peripheral area (II) may be employed for discrimination between the image and background regions.

Method B

As previously described, in a color original with a common composition, an image region where a predominant picture portion is present contains a larger amount of image information than a background region. The difference in density between scanning spots or picture elements in the image region is larger than in the background region.

When photometric measurement is made on a series of spots in the respective regions, the frequency of occurrence of difference in measured density between spots is high in a range of relatively large density differences for the image region, and the frequency of occurrence of difference in measured density between spots is high in a range of relatively small density differences for the background region. Since the proportion that extremely high or low density regions occupy in the overall picture composition is not high, the frequency of occurrence of extremely high or low density measurements is generally low.

A commonly used copy machine is generally designed such that a table on which an original rests has a larger area than the original. Also a retainer plate which is positioned above the table for retaining the original in place on the table generally has an original contact surface colored white. A color original in sheet form resting on the table of the copy machine is scanned with light directed through a slit for photometric measurement. During scanning, part of irradiating light is transmitted by the table at those (usually marginal) regions where the original is absent and then reflected by the white contact surface of the retainer plate, entering photometric measuring means. In a situation where the original occupies only a small area of the table surface leaving a large empty area, density measurements at spots in the empty area frequently appear in a lowest density level range.

Figure 5:
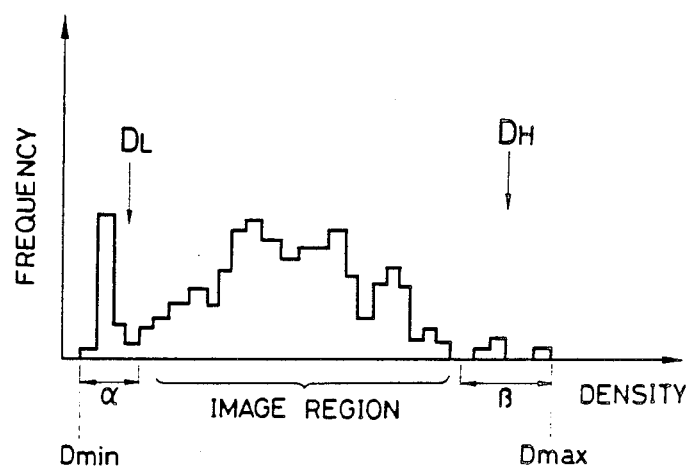
FIG. 5 is a histogram showing the frequency of photometric density measurements of scanning spots obtained when a color original sheet having a smaller area than the scanning range is scanned with light through a slit.

This is graphically represented in the histogram of FIG. 5 showing the frequency of density measurements at spots on the original surface.

When it is desired to make a copy in a situation where a voluminous book as an original is rested on the table with necessary pages thereof faced to the table surface as previously described, a large space is left between the pages to define on the table surface a free region which should otherwise belong to the original region. Part of irradiating light is transmitted by the free region of the table surface and never or little reflected thereat. That is, the free region reflects no or little light toward the photometric measuring means. A very high density measurement is thus obtained in the free region or page-to-page space.

In an original in the form of a book presenting such a large page-to-page space, the frequency of occurrence of density measurements at spots in the free region corresponding to the space is high in a highest density level range.

Figure 6:
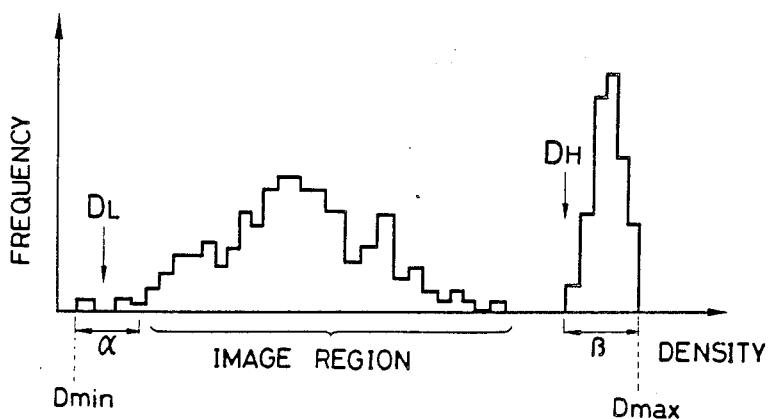
FIG. 6 is a histogram showing the frequency of photometric density measurements of scanning spots obtained when a color original having an empty space is scanned with light through a slit.

This is graphically represented in the histogram of FIG. 6 showing the frequency of density measurements at spots on the original surface.

A similar problem occurs with a three-dimensional article because the retainer plate cannot be used or can be used but spaced apart from the table surface.

For the purpose of reproducing an image of quality from a color original, the presence of density measurements having such an extremely high or low level adversely affects the arithmetic operation for computing an optimum density value. Therefore, such abnormal density measurements must be excluded from operational factors used in the optimum density computing process.

Method B based on the above-mentioned concept will be described with reference to FIGS. 5 and 6.

First, the minimum and maximum densities Dmin and Dmax are determined in a photometric measurement region, giving a basis for the optimum density computing process.

The photometric measurement region may be a region corresponding to an original having the largest area among color originals to be copied or a region matched with the length of a scanning line during photometric measurement. For example, the photometric measurement region has the area of the original support table of the copy machine.

The minimum density Dmin used herein may be an actual photometric measurement as well as a density value corresponding to the white color applied to the contact surface of the retainer plate of the copy machine. The maximum density Dmax used herein may be an actual photometric measurement as well as a density value corresponding to black color and a photometric density measurement obtained with an open table, that is, in the absence of both the original and the retainer plate on the table.

Next, a range of density measurements having an extremely low level which are considered abnormal is set as a range $\alpha$ of from Dmin to (Dmin+$\alpha$) in FIGS. 5 and 6, and a range of density measurements having an extremely high level which are considered abnormal is set as a range $\beta$ of from (Dmax−$\beta$) to Dmax in FIGS. 5 and 6. The limit values of density measurement (Dmin+$\alpha$) and (Dmax−$\beta$) below or above which density measurements are considered abnormal are used as operational factors in the optimum density computing process. The limit values are stored in storage means in the photometric measuring means or storage means in optimum density computing means and eventually supplied to the computing means. The photometric measuring means and optimum density computing means used herein may be of the organizations per se known for such purposes.

For density value, $\alpha$ is in the order of from 0.01 to 0.20 and $\beta$ is in the order of from 0.05 to 0.50. It is to be noted that $\alpha$ may be set so as to contain the density of the retainer platen or a white area of an ordinary original. Also, $\beta$ may be determined on the basis of the precision of a photometric sensor or the maximum density of 1.5 to 2.0 which is available with an ordinary reflected image.

Alternatively, a density value having zero frequency in the histogram or a density value having a minimum frequency in the histogram as shown by $D_L$ and $D_H$ in FIGS. 5 and 6 may be detected in a predetermined range of $\alpha$ or $\beta$, for example, in a range of $\alpha < 0.20$ or $\beta < 0.50$, thereby determining a region having a density of $D_L$ to $D_H$ as an image region.

Various other methods using the histogram will be contemplated. Any methods for the extraction of an image region using the histogram are encompassed within the present invention.

Methods based on a density cumulative distribution curve are also encompassed within the present invention as long as they rely on a principle analogous to the histogram based methods.

The next step is comparison. Prior to copying of a color original, photometric scanning is carried out on the surface of the original. A density value (Dl) measured at each spot on the original surface by suitable photometric measuring means is compared with the above-described two extreme density ranges, determining whether or not the density measurement Dl falls in the range of Dmin+$\alpha \leq$ Dl $\leq$ Dmax−$\beta$. Any picture elements or scanning spots having density measurements within this range are extracted or selected as belonging to the image region. The extracting or selecting means used herein may be region. The extracting or selecting means used herein may be of the organization per se known in the art. In this way, picture elements having density measurements within the range of Dmin+$\alpha \leq$ Dl $\leq$ Dmax−$\beta$ are selected.

Alternatively, instead of photometrically measured density, reflectivity or a value corresponding thereto may be used in processing of the above-mentioned steps.

As to the minimum and maximum densities Dmin and Dmax, they may be measured during photometric scanning on the original surface by photometric measuring means, or values corresponding to the minimum and maximum densities Dmin and Dmax may be previously stored.

The photometrically measured maximum density Dmax may be determined on the assumption of Dl=$\Gamma$ (for example, the density $\Gamma$=2.0) when Dl>$\Gamma$.

The limit values of density measurement (Dmin+$\alpha$) and (Dmax−$\beta$) below or above which density measurements are considered abnormal may be determined for each of primary three colors, for example, red, green and blue. Then the image region may be determined by extracting the photometric measurements for these three colors on the basis of the three density ranges, respectively.

There may be previously stored as a $\delta$ value a density value measured when no original is rested on the table, that is, a density value corresponding to the white contact surface of the retainer plate. Alternatively, a $\delta$ value may be obtained by making photometric measurement up to an extreme end of the original support surface upon photometric scanning. Density values equal to the delta value (Dl=$\delta$) are excluded from operational factors. It is preferred that the delta value has a certain density width.

After picture elements or scanning spots on the original surface having density measurements within the range of Dmin+$\alpha \leq$ Dl $\leq$ Dmax−$\beta$ are selected, a region possessing these picture elements is determined to be the image region. The remaining region is determined to be the background region.

Since there is a possibility that the background region contains not only a white area of the retainer platen, but also a white area of the original, a non-picture region as opposed to a picture region is used as the background region in the present invention.

Method B may be employed alone, but preferably in combination with Method A.

STAGE FOR DETERMINING CHARACTERISTIC QUANTITY OF IMAGE OR BACKGROUND REGION

A common color original which is a copying subject is divided into image and background regions as described above.

Now the density of the image region is determined. After the above-described method for discrimination between image and background regions completes determination of an image or background region, a characteristic quantity of either region, more specifically the density of the image region is determined.

For example, an image density in the image or background region is determined, giving a basis for the optimum density computing process. This determination uses at least one density value selected from an average density, maximum density, minimum density, and photometric density measurement based on the histogram, all measured for the image or background region.

Alternatively, instead of photometrically measured density, reflectivity or various values corresponding thereto may be used in processing of the above-mentioned step. The values corresponding to reflectivity must have the nature of playing the role of photometrically measured density in the image density determining step. This will be later described in conjunction with function fi'(dji).

STAGE FOR DETERMINING OPTIMUM COPYING EXPOSURE

The method for determining an optimum exposure amount for copying described in this section utilizes as one of operational factors the region density measurement associated with either of the image and background regions resulting from the image region density determining method of the previous section. Copying is controlled on the basis of the thus determined optimum exposure amount.

Figure 7:
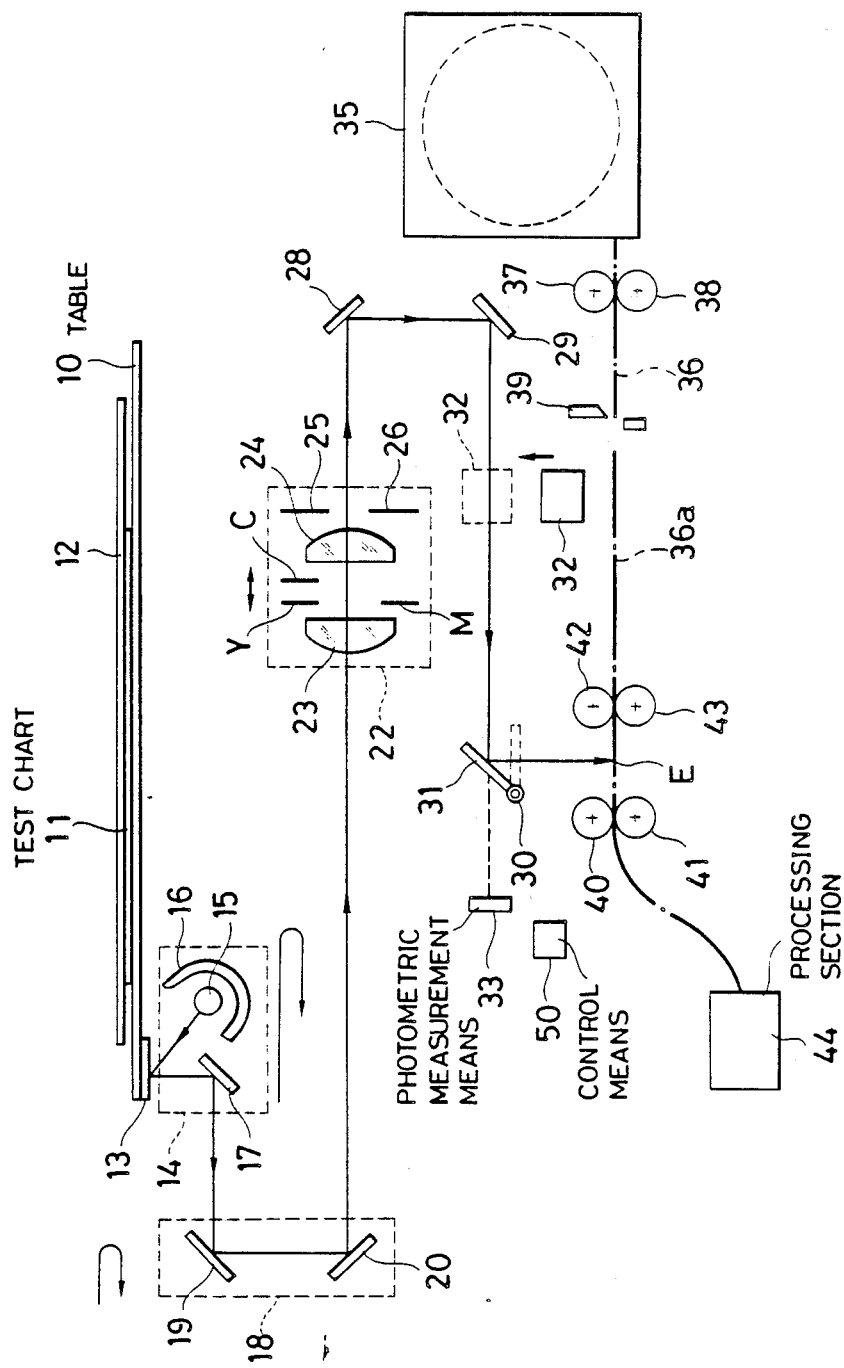
FIG. 7 is a schematic view showing a typical silver salt photographic color copying apparatus to which the method of the present invention is applicable.
Figure 9:
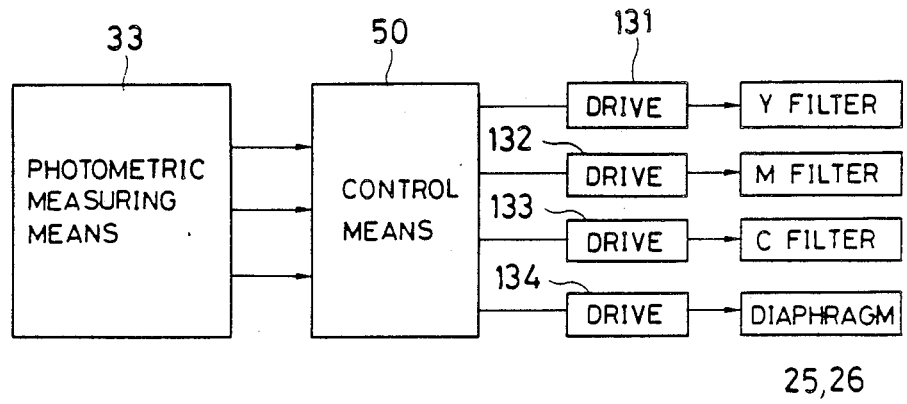
FIG. 9 is a block diagram showing how to set copying conditions in determining an optimum exposure amount.

The optimum exposure determining method uses control means 50 which governs determination of copying parameters including an exposure amount during copying (see FIGS. 7 and 9).

The control means 50 includes ordinary components as found in conventional control means adapted for copy machines, such as computing means, storage means, and output means and special means associated with the present invention, such as means for determining photosensitive characteristic values of a photosensitive material, means for extracting a region from the copying subject, and means for determining a characteristic quantity of the image region.

The photosensitive characteristic value determining means may be designed such that a set of photosensitive characteristic values to be used in copying may be supplied to the computing means by manual operation or automatic reading operation with the aid of a bar code. Where plural types of photosensitive material each having a different set of photosensitive characteristic values are provided in the copy machine, a particular one of the photosensitive characteristic value sets is selected by manual operation or automatic reading operation.

The region extracting means functions, upon actual copying of a color original, to extract scanning spots by classifying them into either of the image and background regions according to the above-mentioned image and background region discriminating method, and then determine the density fi'(dji) of either one or both of the image and background regions.

Once the control means 50 of such organization is prepared, the optimum copying exposure determining method of this stage is practiced.

(1) First, a set of photosensitive characteristic values of a photosensitive material to be used is selected and supplied to the control means 50.

(2) Reference is now made to the apparatus which is shown in FIG. 7 as including an original support table 10 and a reference bar 13 attached to a suitable portion of the lower surface of the table. A test chart 11 is rested on the table 10 and then photometrically scanned with light irradiated through a slit.

Light beams reflected by the reference bar 13 and test chart 11 are measured by the photometric measuring means 33. The thus photometrically measured information values of three color light components associated with the reference bar 13 and the photometrically measured information values of three color light components associated with the test chart 11 are supplied to the computing means of the control means 50 where density values Do of the test chart 11 are computed and stored in the storage means.

(3) Then copying operation is actually carried out to make a color copy of the test chart 11. The resulting color copy is rested on the table 10 instead of the test chart and subjected to photometric scanning on its surface.

The photometric measuring procedure carried on the color copy is the same as the above-described procedure on the test chart and the detailed description thereof is omitted. At the end of this photometric scanning, density values Dc of the color copy of the test chart are computed and stored in the storage means.

It will be understood that the photometric information values obtained in these two photometric scanning procedures (2) and (3) may be actual photometric density values or values corresponding thereto. The corresponding values used herein include logarithmic conversions of the photometric density values, a functional equation corresponding to original lightness, and any other suitable values calculated on the basis of a conversion table.

Figure 10:
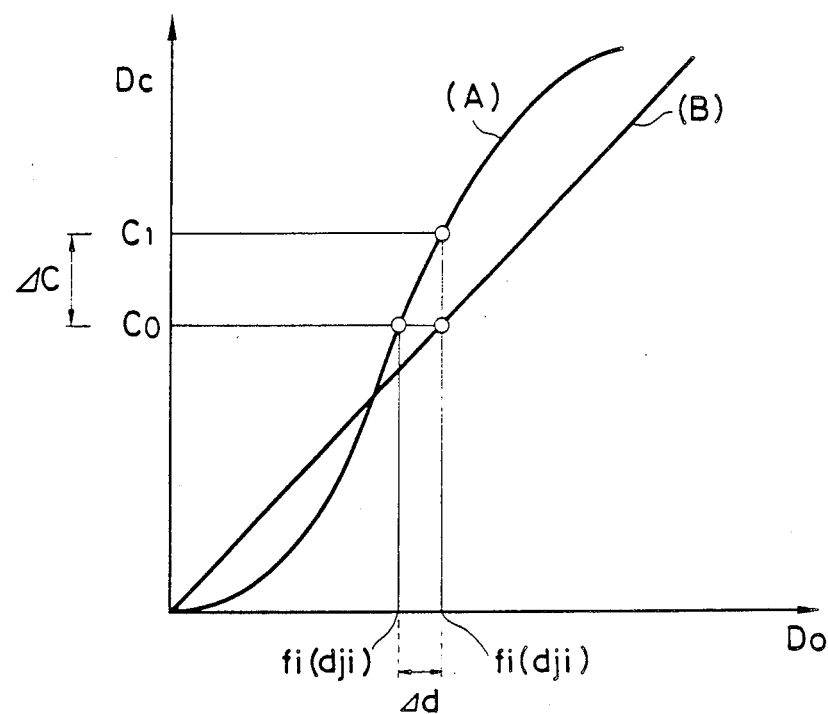
FIG. 10 is an exposure correcting graph showing original density vs. copying density relationship useful in determining an optimum exposure amount.

(4) The density values Do of the test chart obtained in procedure (2) and the density values Dc of the color copy of the test chart obtained in procedure (3) are plotted on the abscissa and ordinate of a diagram, creating a curve (A) representative of original density vs. copy density as shown in FIG. 10.

This image reproduction curve (A) in the graph provides image reproduction characteristic data (A) at a series of points of time during copying of the color original, which are stored in the storage means. The image reproduction characteristic data (A) may be represented by density values for any one of the three colors. But preferably, such data may be obtained for all the colors and additionally, for the types of original (for example, graphic prints, photographic prints, and illustrations) and the types of copying material or photosensitive material (for example, soft/hard, reflective/transmissive, negative/positive). The image reproduction characteristic data (A) may be a table of data or a functional equation. It is also possible to previously set the data (A). In this case, the data (A) may be stored as a table or functional equation without a need for the procedures (1) to (4) mentioned above. It is also possible to input such data from the exterior manually or with the aid of a storage medium in the form of an IC card whenever the type of copying material is changed.

(5) At the same time as the preparation of image reproduction characteristic data (A), reproduction density control data (B) as shown in FIG. 10 are computed and stored in the storage means. This reproduction density control data (B) may be obtained using the equation relating to the two density values Do and Dc mentioned above:

$$Dc = Ka \times Do + Kb$$

wherein Ka and Kb are constants. In FIG. 10, straight line (B) is drawn on the assumption that Ka=1.0 and Kb=0.0, for example. It is to be noted that Ka corresponds to $\gamma$.

Alternatively, Dc may be obtained as a linear or nonlinear function of Do or a table of data. Preferably, plural sets of reproduction density control data (B) are prepared for the types of original and photosensitive material as in the case of image reproduction characteristic data (A).

This reproduction density control data (B) may be previously set as arbitrary data or set manually. When plural sets of reproduction density control data (B) are prepared, selection of a particular one may be carried out manually or automatically. The data may also be available as a graph of polygonal lines having different gradients in low, intermediate and high density sections.

(6) The optimum copying exposure determining method utilizes the equation:

$$Doi = fi(dji) \text{ or}$$

$$Doi = fi(dji) + gi(vji)$$

in order to determine the optimum exposure amount as a copying parameter.

In the equations, Doi is an exposure amount controlling density for determining the optimum exposure amount or a value corresponding thereto. The other variables and symbols used in the equations have the following meanings.

A variable fi(dji) is an original density value which is determined from either a density value characterizing the density of an image region or a value corresponding thereto, or a density value characterizing the density of a background region (including a texture density) or a value corresponding thereto. In either case, this value is determined using the image reproduction characteristic data (A) and reproduction density control data (B) mentioned above. It is to be noted that fi(dji) is used instead of an actual image or background region density fi'(dji) described later.

A variable gi(vji) is a correction value for fi(dji) and may be determined from a value related to an image predictable to be a predominant image portion, a value related to the background region, or a value related to a particular image.

A symbol dji represents at least one density value selected from an average density, maximum density, minimum density, and histogram based density determined for the image region or a value corresponding thereto, or at least one density value selected from an average density, maximum density, minimum density, and histogram based density determined for the background region (including a texture area) or a value corresponding thereto. The histogram based density used herein includes a density at the maximum or predetermined frequency of occurrence in the histogram, a density under predetermined conditions in the density cumulative distribution, and the like.

Another symbol vji represents a standard component of a value related to an image predictable to be a predominant image portion, which includes the following.

(a) An average density of a particular portion such as a central portion of an original or an image region thereof, or a weighted average density having a weight added to the particular portion.

(b) A characteristic value of a region of an original excluding a central or peripheral region (for example, density, area, color, and proportion of the region).

(c) An average density of a region with a particular color.

(d) A characteristic value of a high saturation or neutral color region (for example, density, area, and color).

(e) A density of a portion having a color or density level occupying a large proportion of area.

(f) A maximum and/or minimum density or a certain density level including them.

(g) A characteristic value or quantity of a region assigned to be a predominant image portion.

(h) These items (a) to (f) are applicable when an original is divided into a plurality of image regions. An average of the corresponding plurality of values or a selected value is used.

The symbol vji may also be a value dependent on the background region, for example, a value dependent on the area or percent area of the texture, a particular image or an original (for example, an original including much areas of high saturation or an original exhibiting poor color reproducibility upon copying). The symbol vji represents a value of at least one element selected from the above-mentioned variety of elements.

Letter i represents that the associated symbol relates to one of R, G and B or common to R, G and B and letter j represents a characteristic value. More specifically, i represents a parameter associated with one of R, G and B or common to R, G and B, and j represents a characteristic value of the image and/or background region.

In an example utilizing density cumulative distribution, the variable fi(dji) is expressed by the following equation.

$$fi(dji) = l1 \cdot dmini + l2 \cdot dmaxi$$

wherein dmin and dmax are minimum and maximum densities in a particular cumulative frequency range obtained from the density cumulative distribution of the image region, and l1 and l2 are constants.

In another example, the variable fi(dji) may be expressed by the following equation:

$$fi(dji) = l1i' \cdot d1i' + l2i' \cdot d2i' + l3i' \cdot d3i'$$

wherein d1i' is an average image density of the image region, d2i' is an intermediate value between the maximum and minimum image densities of the image region, d3i' is an average density of the background region, and l1i', l2i', and l3i' are constants.

In a further example, the variable fi(dji) may be expressed by the following equation:

$$fi(dji) = l1i'' \cdot d1i''$$

wherein d1i'' is a density having the highest frequency among densities in the image region, and l1i'' is a constant. In the equation, i may have different values for R, G, and B or a value common to R, G, and B.

The symbol vji may also be a correction value dependent on the color background region, for example, a correction value dependent on the area or percent area of the background. This term becomes an effective correction factor because the larger the area of the background, the more important is the density or color of the background. Also, vji may be a correction value dependent on the area of the image regin or a correction value dependent on a particular image or an original.

If it is previously known that a color original is a portrait or an original having a person taken as a predominant image, or the frequency of occurrence of such pictures is high as in the case of color photographs, term vji may be a characteristic quantity of an image portion having a predetermined color, for example, an average density, maximum density, minimum density or a combination of thereof. Term vji may be considered zero if originals do not contain the predetermined color or contain only a small area of the predetermined color. Term fi(dji) is determined as an image density for cases where person images are not predominant whereas gi(vji) serves as a correction factor for cases where person images are predominant.

For similar reasons, term vji may be a percent area A of the background and gi(vji)=gi(A) may be utilized as a correction factor. More specifically, gi(Ai)=Ci·A may be utilized wherein Ci is an average of densities of various colors in the background.

Correction may be made such that the higher Ai, the more important is Ai as a factor for the reproduction of background density, or gi(A) may be changed in accordance with the color or density of the background. Also, correction may be made such as to correct highlight characteristics, particularly color characteristics of a photosensitive material or copying material.

When a correction value dependent on a particular image or original is utilized, correction may be based on an original including significant areas of high saturation (e.g., red and yellow) or an original exhibiting poor reproducibility of a desired color (e.g., green) upon copying. In practice, a density or color correction may be used. For an original having large red areas, for example, the exposure amount determined from fi(dji) may be corrected toward red (or toward removal of cyan color), resulting in reproduction of a more brilliant desired copy.

In the case of an original including significant areas of high saturation, percent areas of respective colors or saturation and percent areas may be used for classification. If necessary, sensors of three or more colors may be used for more free classification.

Figure 8:
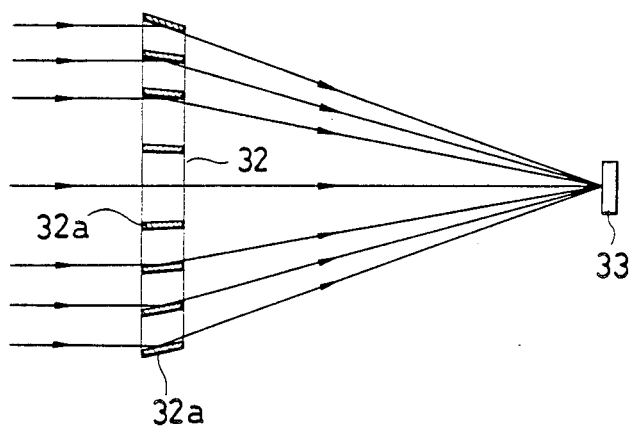
FIG. 8 illustrates the structure of a condensing mirror used in the apparatus of FIG. 7.

The above-described method for determining an optimum exposure amount for copying will be practiced with a silver salt photographic color copying apparatus as shown in FIGS. 7 and 8.

Referring to FIG. 7, there is illustrated a silver salt photographic color copying apparatus as comprising a transparent table 10 for supporting an original thereon. The table 10 has dimensions or an area larger than a test chart 11 and any color originals from which copies are to be made. The table 10 includes an original rest area and a margin. A retainer 12 having a white lower surface is pivotably mounted to a frame of the apparatus (not shown) such that the retainer may close the table 10. More particularly, the retainer 12 on its lower surface covers the test chart 11 or color original which rests on the table 10 as shown in FIG. 7. A reference bar 13 which is colored achromatic such as white or grey is attached to the left lower end of the table 10 outside the original rest area.

A light source or illuminant unit 14 is disposed below the table 10 such that it may be moved back and forth along the table 10 to carry out scanning at a predetermined speed. The illuminant unit 14 includes a bar-shaped light source 15, a reflector 16, and a mirror 17 positioned at an angle of 45° with respect to the surface of the table 10. The light source 15 emits light through a slit to scan over a surface including the lower surface of the reference bar 13 and the test chart 11 or color original resting on the table 10 while the illuminant unit 14 is moved back and forth along the table 10.

A mirror unit 18 is disposed adjacent the illuminant unit 14 such that it may be moved in cooperation with the illuminant unit 14. More particularly, the mirror unit 18 is moved back and forth in the same direction as the illuminant unit 14, but at a half speed thereof. The mirror unit 18 includes a pair of vertically spaced apart mirrors 19 and 20 which are inclined such that incident light from the illuminant unit 14 is reflected in a parallel, but opposite direction toward a lens unit 22.

The lens unit 22 is aligned with the lower mirror 20 of the mirror unit 18. The lens unit 22 has built therein a copying optical system including a front lens group 23 and a rear lens group 24. Lens components of the lens unit 22 are adjustable on a main optical axis such that when it is desired to change the copying magnification, for example, the lens unit 22 may correct a deviation of a focal point resulting from magnification changing operation by relative motion between the illuminant unit 14 and the mirror unit 18.

The lens unit 22 further includes a yellow filter Y, a magenta filter M, and a cyan filter C. The filters Y, M and C are disposed in proximity to the principal point between the two lens groups 23 and 24 such that they are movable perpendicular to the main optical axis. The amount of insertion of the filters into the light path about the main optical axis may be independently changed by means of drive units 131 to 133 described later. By changing the amount of insertion of the filters into the light path, the light reflected by the test chart 11 or color original (often referred to as "reflected light from the color original") is adjusted in quality to correct its color balance. An ND filter may be added if desired.

Diaphragms 25 and 26 are disposed aft of the rear lens group 24 and movable perpendicular to the main optical axis. The diaphragms 25 and 26 are moved by means of a drive unit 134 described later so as to adjust the quantity of reflected light from the color original. Two vertically spaced apart mirrors 28 and 29 are fixedly disposed with respect to the main optical axis light path. They are in relative position such that the reflected light from the color original through the lens unit 22 is directed to photometric measuring means 33 or a slit exposure position E which will be described later.

Disposed in the light path extending from the lower fixed mirror 29 is a mirror 31 for switching the light path between a photometric measurement light path and a copying light path. The switching mirror 31 is rotatably mounted on a pivot 30 upstream of the photometric measuring means 33. A condensing mirror 32 is disposed for motion near the light path between the lower fixed mirror 29 and the switching mirror 31 such that the condensing mirror 32 may intervene the light path. The condensing mirror 32 is in the form of an assembly of a plurality of mirror segments 32a which are inclined at angles corresponding to the respective distances from the main optical axis as shown in FIG. 8.

In the ordinary copy mode, the switching and condensing mirrors 31 and 32 are in the position (copying position) shown by solid lines where the reflected light from the color original past the fixed mirrors is directed to the slit exposure position E. In the copying condition determining mode in which the reflected light from the color original is photometrically measured, the switching mirror 31 is rotated to a retracted position shown by broken lines and the condensing mirror 32 is moved forward to the position traversing the light path shown by broken lines, both in cooperation with the selection of the mode, for example. That is, the switching and condensing mirrors 31 and 32 are in the photometric measuring position where the reflected light from the color original enters the photometric measuring means 33 through the condensing mirror 32.

The photometric measuring means 33 disposed at the end of the light path is a three color density reading unit which includes three sensors, a sensor 33a for red light, a sensor 33b for green light, and a sensor 33c for blue light, and can photometrically measure the three color components of the reflected light from the color original. Although the photometric measuring means 33 is described as a density reading unit including three sensors in the preferred embodiment, it may be a density reading unit having only one sensor for a representative color.

A magazine 35 receives a roll of copying material or photosensitive material 36 therein. Although only one magazine is shown in the embodiment of FIG. 7, a plurality of magazines may be provided. For a silver salt photographic color copying apparatus in which one for the desired photosensitive properties is selected from plural types of photosensitive material, a corresponding plurality of magazines containing different types of photosensitive material may be provided. In this embodiment, suitable selection means is provided for selecting the desired one type of photosensitive material from the magazines and supplying it to the slit exposure position E.

A pair of take-up rollers 37, 38 are disposed in front of the magazine 35 for taking the photosensitive material 36 out of the magazine 35 when it is desired to make a copy of a color original. A cutter 39 is disposed downstream of the take-up rollers 37, 38 for cutting the photosensitive material 36 into a section 36a of a predetermined length.

Two pairs of rollers 40, 41 and 42, 43 are for carrying forward the section of photosensitive material 36a to the slit exposure position E. The rollers are rotated in synchronization with the scanning operation of the illuminant unit 14 for moving the section of photosensitive material 36a for exposure during the color original scanning/exposure process, and at the end of the exposure, for carrying the exposed section of photosensitive material 36a to a processing section 44.

The processing section 44 is for processing the exposed section of photosensitive material 36a including development, breaching, fixation, washing and drying. The processing section 44 is usually equipped with a take-out tray (not shown) for carrying the dried section of photosensitive material outside the apparatus.

The photometric measuring means 33 is coupled to the control means 50 whose organization and function are previously described. The control means functions to determine a copying parameter, that is, an optimum exposure amount based on the functional equation: $Doi = fi(dji) + gi(vji)$ and to control the drive quantity of the drive units 131 to 134 based on the copying parameter as shown in FIG. 9.

The drive units 131–134 may be in the form of a pulse motor or solenoid and act to drive the filters Y, M and C and diaphragms 25, 26 in accordance with an exposure amount control signal from the control means 50.

The silver salt photographic color copying apparatus described above is generally provided with a key for setting the copying parameter detemining mode to be operated when it is desired to determine the copying parameter, a key for setting the copying mode to be operated when it is desired to make a copy from a color original, and a key for starting exposure although they are not shown.

The operation of the silver salt photographic color copying apparatus described above is described with reference to FIGS. 7 to 9.

(11) First, the key for setting the copying parameter determining mode is operated to set the apparatus to the copying parameter determining mode. Once the copying parameter determining mode is set, the filters Y, M and C and diaphragms 25, 26 are set in the respective standard positions. The switching and condensing mirrors 31 and 32 are set in the photometric measurement position shown by broken lines. There is established a light path along which the reflected light from the color original can enter the photometric measuring means 33.

In this situation, the test chart 11 is rested on the table 10 in place and held stationary by the retainer plate 12 before the exposure starting key is operated. The illuminant unit 14, mirror unit 18, and lens unit 22 are synchronously moved in the forward direction, carrying out a first photometric scan on the reference bar 13 and test chart 11.

During the first scanning, the light emitted by the illuminant unit 14, after being reflected by the reference bar 13 and test chart 11, passes the mirror 17 of illuminant unit 14, mirror unit 18, lens unit 22, fixed mirrors 28, 29, and condensing mirror 32 where it is condensed, and enters the measuring means 33.

(12) Upon receipt by the measuring means 33, the light reflected by the reference bar 13 and the light reflected by the test chart 11 are separated into three color components and photometrically measured by the sensors 33a to 33c of the measuring means 33 in a time series manner. There are obtained photometric information data associated with the reflected light.

The photometric information data are fed to the control means 50 where a density value Do described in procedure (2) in association with the test chart 11 is computed therefrom and stored in the storage means.

(13) The first photometric scan is completed when the illuminant unit 14 has been moved to the rightmost end of the table 10. A subsequent operation is started for copying the test chart 11. Prior to the start of copying operation, the light path is switched by automatically displacing the switching and condensing mirrors 31 and 32 to the copying position shown by solid lines where the reflected light from the color original may reach the slit exposure position E.

In this situation, the photosensitive material 36 is taken out of the magazine 35 by means of the pair of rollers 37, 38, and cut into a section 36a having the predetermined length. The section of photosensitive material 36a is carried forward by the paired rollers 40–43 to the slit exposure position E. There is established a situation where copying of the test chart 11 is possible.

In accordance with the predetermined sequence, the illuminant unit 14 starts scanning in a backward direction (which is a copying, but second scan). The section of photosensitive material 36a at the slit exposure position E is moved for slit exposure in synchronization with the scanning.

At the end of the slit exposure, the exposed section of photosensitive material 36a is carried to the processing section 44 due to continuous rotation of the rollers 40–43. The exposed section of photosensitive material is subjected to a series of processing steps including development, bleaching, fixation, washing and drying, completing a color copy of the test chart 11.

(14) At the end of the first backward scanning (second scanning), the switching and condensing mirrors 31 and 32 are restored to the photometric measurement position. There is again established a light path along which the reflected light from the color original can enter the photometric measuring means 33.

Then the test chart 11 is removed from the table 10 and instead, the color copy of the test chart made in (13) is rested on the table 10. With the exposure start key turned on, the illuminant unit 14 starts a second forward scanning (third scanning) for photometric measurement purpose. As in the first forward scanning, the light reflected by the reference bar 13 and the color copy enters the measuring means 33.

As in the first forward scanning, the light reflected by the reference bar 13 and color copy is separated into three color components and photometrically measured by the measuring means 33 in a time series manner, obtaining photometric information data. The photometric information data are fed to the control means 50 where a density value Dc described in procedure (3) in association with the color copy of test chart 11 is computed therefrom and stored in the storage means.

(15) Now that the density value Do associated with the test chart 11 and the density value Dc associated with the test chart color copy are given, the control means 50 forms the image reproduction characteristic data (A) using them. The control means 50 is previously given the reproduction density control data (B).

The foregoing procedures (11) to (15) complete a setting of copying conditions. This setting procedure is a routine operation which may be regularly done at the beginning of everyday business.

(16) After the setting of copying conditions is completed, the test chart color copy is removed from the table 10. Instead, a color original to be copied is rested on the table 10 for a third photometric scanning. This third photometric scanning is generally executed as a prescanning prior to copying of the color original in practice, although it is described as an extension of the previously described copying parameter determining mode just for convenience of explanation.

Figure 11:
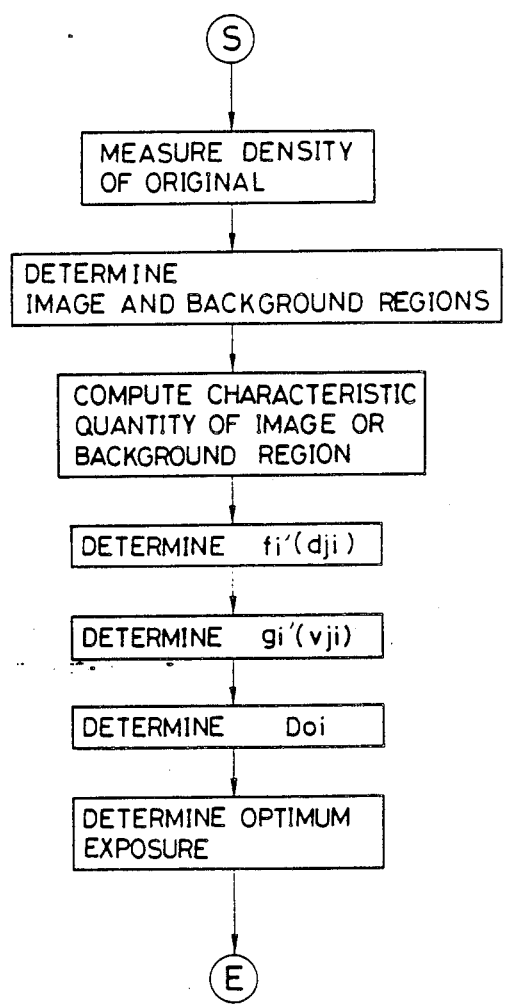
FIG. 11 is a flow chart illustrating steps of determining an optimum exposure amount.
Figure 12:
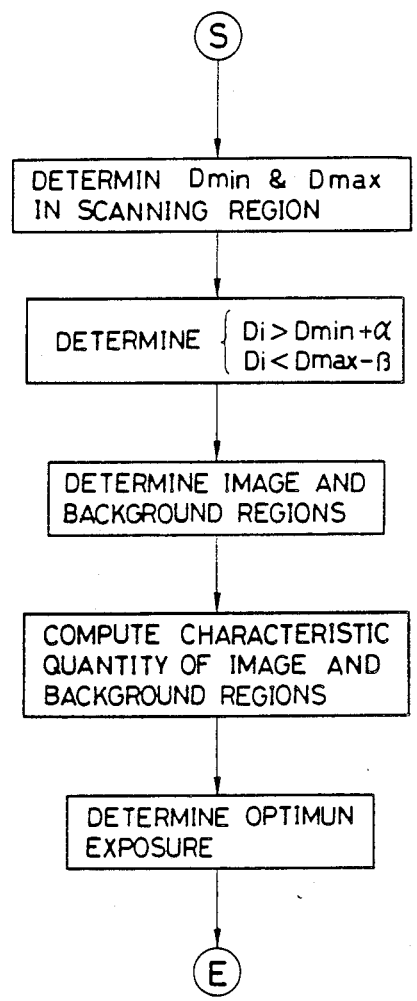
FIGS. 12 and 13 are flow charts illustrating steps of determining an optimum exposure amount according to different embodiments.
Figure 13:
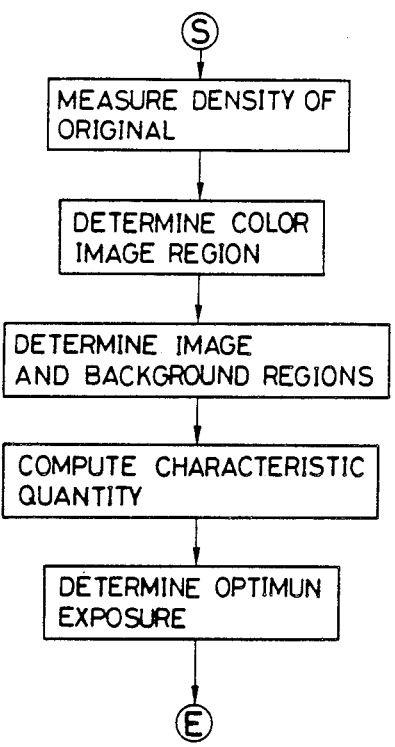

In this photometric scanning, as shown in FIGS. 11 to 13, the reflected light from the color original is photometrically measured by the measuring means 33. Then the original density value fi'(dji) of the image and/or background region of the color original is actually determined by approximately following the above-mentioned procedures.

The image or background region is extracted based on density measurements from the color original as previously described.

The original density value fi'(dji)=Doi' is determined from the actual density measurements of the image and/or background regions.

Using the fi'(dji) and the reproduction density control data (B) of FIG. 10, a copy density Co on the reproduction density control data (B) is determined. From Co and the image density reproducing data (A), an original density value fi(dji) is determined. The copying exposure amount is determined from the image density reproducing data (A) such that the original density value fi'(dji) becomes the copying density Co. If the spectral sensitivity distribution of the photometric sensor is exactly in agreement with that of a copying material, the original density is equal to a logarithmic value of a copying exposure amount. Then the copying exposure amount is determined from the original density fi(dji) or Doi. An original density value Doi' is determined by the equation:

$$Doi' = fi'(dji)$$

or $$Doi' = fi'(dji) + gi'(vji),$$

as mentioned above, optionally by adding a value of gi'(vji) which is determined in relation with an image presumed to constituted a predominant image portion or a background region or a particular image (or original) to the above-obtained density value fi'(dji).

(17) Now the filters Y, M and C and/or the two diaphragms 25, 26 which have been in the standard position are displaced by means of the respective drive units 131-133 in order to establish the exposure amount control density value Doi determined from Doi' on the basis of which the optimum exposure amount is determined. The amounts of insertion of the filters Y, M and C into the main optical axis light path and/or the opening between the diaphragms 25 and 26 is changed so as to meet the optimum exposure amount.

It is also possible that the exposure amount control density value Doi on the basis of which the optimum exposure amount is determined is used to control the original irradiation amount or scanning speed so as to provide the optimum exposure amount.

(18) The apparatus is designed such that the illuminant unit 14 and other components restore their original position at the completion of the third photometric scanning. After the illuminant unit 14 and other components restore their original position, the copying mode key is turned on, bringing the silver salt photographic color copying apparatus into the copying mode.

In the copying mode of the apparatus, the switching and condensing mirrors 31 and 32 are in the slit exposure position shown by solid lines where the reflected light from the color original can be focused on the slit exposure position E. At the same time, the section of photosensitive material 36a taken out of the magazine 35 is fed to the position where it can be transferred in synchronization with the copying scan by the illuminant unit 14, that is, where the section of photosensitive material 36a can receive slit exposure.

If the exposure start key is turned on with the color original rested on the table 10, exposure to the section of photosensitive material 36a is started by basically the same copying procedure as described for the copying of the test chart 11. Now that the amounts of insertion of the filters Y, M and C into the main optical axis light path and/or the opening between the diaphragms 25 and 26 has been changed to the position for the optimum exposure amount, there is obtained a color copy of the color original having a high degree of reproducibility and fidelity which would never been achieved by the prior art method.

The present invention has been described with respect to its one aspect of reproducing an image density with high fidelity. The present invention is not limited thereto and allows the users to utilize the reproduction density control data so as to meet their special purposes.

In this case, the reproduction density control data is formed by modifying Ka as γ value and other factors. It is preferred to prepare plural sets of such reproduction density control data in expectation of the special purposes of the users, and they are presented such that any desired one may be selected therefrom by a manual or automatic section means. A provision may also be made such that the reproduction density control data may be modified depending on the image contents of an original.

The above-described original density value fi'(dji) or Doi' may be determined as a function of characteristic quantity of each region. For example, it can be calculated by the equation:

$$fi'(dji) = Kaid1i + Kbid2i + Kcid3i +$$

d1i: $(\Sigma dk)/k$, average density of an image or backgroung region.
d2i: dmax, maximum density of an image or background region.
d3i: dmin, minimum density of an image or background region.
Kai, Kbi, Kci: constants including zero.

It is also possible to convert the above-mentioned equation:

$$Doi' = fi'(dji) + gi'(vji)$$

to $$Doi' = Fi'(dji, vji).$$

In this case, Fi' is computed from the value of Fi'(dji, vji) corresponding to the above-mentioned value of fi'(dji) by utilizing the image reproduction characteristic data (A) and reproduction density control data (B).

Further, it is possible to compute Doi from the equation:

$$Doi = fi(dji) + gi(vji).$$

In this case fi and gi are respectively computed from the value of fi'(dji) and gi'(dji) by utilizing the image reproduction characteristic data (A) and reproduction density control data (B).

It is also possible to replace fi(dji) by fi'(dji)−Δd. An exposure correcting amount Δd for correcting the reproducing density by ΔC may be determined from ΔC=C1−C0 in FIG. 10.

As to the image reproduction characteristic data (A) and reproduction density control data (B), they may be created using previously stored photometric information values or real time values at the time when the test chart 11 and the color copy thereof are read. Also, the difference between the image reproduction characteristic data (A) and reproduction density control data (B) may be directly stored and used for control. It is not necessary to determine Doi by following the procedure of FIG. 10 because FIG. 10 is one exemplary method for determining Doi from the image reproduction characteristic data (A) and reproduction density control data (B).

Where the image reproduction characteristic data (A) and reproduction density control data (B) are created for each of the different types of copying material, it is convenient to provide manual or automatic selector means such that a particular type of copying material and a particular set of image reproducing data may be selected at the same time.

The way of utilizing the image reproduction characteristic data (A) and reproduction density control data (B) may be selected depending on whether the object is to reproduce an image density with high fidelity or to reproduce an image density for the user's special purpose.

It is preferred to previously determine a color image region from the data of original density read out as described above. The color image region may be determined with the criterion that a color deviation from neutral or achromatic color exceeds a certain value. As the case may be, a color density may be calculated on the basis of a read original density before the color image region is determined. Such a color deviation may be determined using an index given by the formula:

$$|(R-C_R min) + (G-C_G min) + (B-C_B min)|$$

wherein R, G and B are logarithmic values of photometric measurements of the respective colors, and $C_R min$, $C_G min$ and $C_B min$ are minimum values of R, G and B. In addition, a color deviation may be a value corresponding to a difference from a certain color (e.g., neutral color).

More specifically, saturation and hue may be employable.

The saturation may be a value selected from $$|(R-W) + (G-W) + (B-W)|$$

wherein $W = (K1R + k2G + k3B)/(k1 + k2 + k3)$, k1, k2 and k3 are constants, $$|(R-G)| + |(B-G)|,$$

$$|R-G| + |G-B|,$$

$$(R-G)^2 + (B-G)^2,$$

$$(R/G + B/G),$$

wherein
R, G, and B are as defined above,
a chroma value in the C.I.E. colorimetric system, and
a value determined from the chromaticity coordinate table.

The hue may be a value of $(R-G)/(G-B)$, or a value calculated from an angle in the chromaticity coordinates, an angle of a coordinate point in the chromaticity diagram, or a color change in the chromaticity coordinate table.

After the color image region has been determined as described above, an original to be copied is classified into a color original predominantly composed of a color image or a black-and-white original predominantly composed of a black-and-white image by determining on the basis of the determined color image region.

Figure 14A:
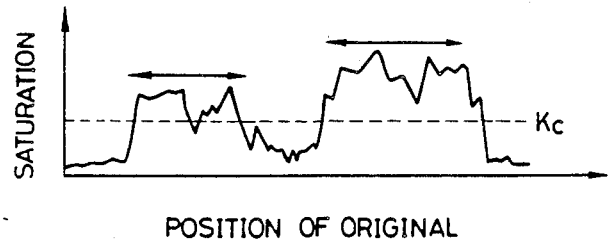
FIGS. 14A and 14B are graphs used in the classification of an image in terms of saturation.
Figure 14B:
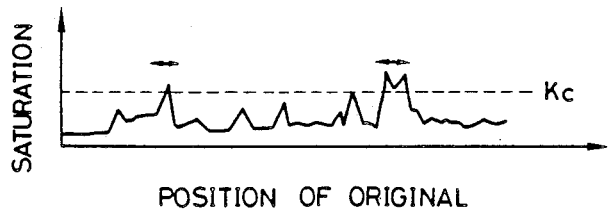

Such classification may be made by determining a color image region from the relation between saturation and original position as shown by double-head arrows in FIGS. 14A and 14B. A color image region is determined using as a criterion the threshold (kc) of saturation above which a region is determined to be a color image region.

Determination using the threshold (kc) of saturation as a criterion may be made by comparing a proportion of a color image region relative to the overall region with an area, number, distance or distribution thereof.

It is also encompassed within the present invention that as original having no color image region is classified into a black-and-white original on the basis of the characterizing absence of a color image region. Instead of directly determining a color image region on the basis of an original density, it is also possible to first determine an image region and then determine whether or not it is a color image region. It is also possible to first determine a black-and-white region and then determine whether or not it is a color image region. All these variants are encompassed within the present invention.

On the basis of the above-described determination, an original as shown in FIG. 14A is classified as a color original whereas an original as shown in FIG. 14B is classified as a black-and-white original.

In the case of a black-and-white original, some high values of saturation appear as shown in FIG. 14B. Such high values of saturation appear for various reasons. The causes may be attributable to a high level of image density or the precision of a photometric measurement system, or because the color of the original is not necessarily neutral, or because a color which is neutral to the eye can be non-neutral to a photometric measurement system due to the difference in spectral sensitivity distribution between the eye and the photometric measurement system.

Reversely, it sometimes occurs that a color original is not determined to be a color image region. This is because a mixture of two or more different colors accidentally approaches a neutral color, a picture having high and low levels of density is low in saturation, a background portion of neutral color including white portions occupies a large area leaving a small area of a color image portion, or the original contains a background portion or character portion or black-and-white portion. Thus an error can occur if determination between color and black-and-white regions is made merely on the basis of an average of photometric measurements, color of some photometric measurements, or color balance of three primary color photometric measurements.

The present invention eliminates these problems.

Although the original is classified whether it is a color or black-and-white original in the above embodiment, it is possible to further classify the original in sub-classes depending on the type of color image in the case of a color original and the type of black-and-white image in the case of a black-and-white original. More particularly, the color image may be further classified into photographic prints, graphic prints, illustrations, and the like, or depending on color material and gradation. Such classification may be done by an analysis on an image region of the original, or reversely by an analysis on a non-image region of the original. Similarly, the black-and-white image may be further classified into a character image and a multi-gradation image.

An original having both color and black-and-white images may be classified on the basis of characteristic analysis of the respective images.

In addition to the above-mentioned characteristic values of both color and black-and-white images, more detailed characteristic values may be obtained for more precise classification if the photometric measuring means 33 is capable of photometric measurement of more than three colors. For example, the use of a photometric sensor of 700 nm in addition to three primary color photometric sensors of 450 nm, 550 nm, and 650 nm enables separation between a black-and-white image formed by silver or black plate and a black-and-white image formed from a color material having no absorption at about 700 nm or higher. Although these two images are commonly black-and-white images to the eye, their copying conditions are different.

The use of photometric sensors of 500 nm, 600 nm, and 700 nm in addition to the three primary color photometric sensors insures precise discrimination between a color image of three color components and a black-and-white image formed by silver or black plate.

After the original has been classified as above, a choice is made of image control data predetermined for each of the classes, and color copying conditions are set as described above.

Photometric scanning and copying scanning of the test chart are carried out in sucession (or time series) in the illustrated embodiment, but may be carried out concurrently. Instead of the light path switching mirror 31, a half mirror or beam splitter by which part of light is reflected and the remaining is transmitted is located in front of the photometric measuring means 33 so that both a photometric measurement light path and a copying light path are always provided at the same time.

The test chart is used to determine copying conditions in the illustrated embodiment, a pseudo standard original picture substituting for the test chart may be formed by inserting the filters Y, M and C and ND filter relative to the main optical axis light path to suitable extents and used for the purpose of determining copying conditions.

The color image copying method of the present invention is applicable to a variety of apparatus including electrophotographic color copying machines, thermal transfer color copying machines, ink jet color copying machines, laser color copying machines, and video color copying machines in addition to the illustrated embodiment.

Although the preferred embodiment has been described, the color image copying method of the present invention is not limited thereto. Obviously, various modifications and changes may be made within the scope of the present invention.

The color image copying method of the present invention involves extracting an image or background region from a color original, determining a characteristic quantity of the extracted region and optionally, a color and/or density factor of a predominant image portion, a characteristic quantity of the background region, and a correction factor associated with a particular image, and controlling the copying exposure amount in accordance therewith allows for reproduction of a color copy with high fidelity to the color original or in conformity to the special purpose of the user, yielding a color image of quality and stability.

The inventors have made a series of experiments to demonstrate the present invention. One typical example is given below by way of illustration and not by way of limitation.

EXPERIMENT

The apparatus shown in FIGS. 7 to 9 was used to demonstrate the method of the present invention. The detail of this apparatus is described in international application PCT-JP88-01118. The photosensitive material used is the same as used in Example 1 of the international application.

Photometric measurement was done by scanning exposure through a slit of $10 \times 100$ mm at a speed of 100 mm/sec. Three color sensors of 700 nm (R), 550 nm (G) and 470 nm (B) were used for measurement.

The procedures of the present invention are briefly described.

Method A

Scanning regions are determined to belong to an image region when $|Dl,k - Dl+1, k| > 0.01$ for either one of the three colors R, G and B.

Method B scanning regions excluding a region of Dmin to (Dmin+0.04) and a region of Dmax to (Dmax−0.20) are determined to belong to an image region for either one of the three colors R, G and B.

A characteristic quantity of the image region, $fi'(dji) + g'(vji)$ included $$fi'(dji) = 0.60 \Sigma dki/k + 0.10 dmaxi + 0.25 dmini,$$

$$gi'(vji) = Ci \cdot A,$$

and $$Ci = \Sigma dki/k$$

Terms dki designates densities of the background region lower than $\Sigma dki/k$ (background densities).

The reproduction image control data (Curve B) was given by the equation:

$$Dc = 1.10 Do + 0.05.$$

Image reproducing data (Curve A) was calculated from photometric measurements of a test chart and a copy thereof.

Copies were made from one hundred color originals. A copy of each color original was made by previously carrying out photometric measurements on the original, determining an image region by Methods A and B, and computing an optimum exposure amount from the characteristic quantity using Curves A and B, followed by actual copying operation.

The resulting hundred color copies were evaluated by a panel of 30 persons. Isolation between image and non-image portions was found as precise as 98 to 99%, indicating color reproduction with fidelity.

I claim:

1. A method for controlling an exposure amount in copying of a color original, comprising the steps of:
   (a) photometrically measuring a color density or another value corresponding thereto on the surface of the original from its reflected image,
   (b) determining whether or not the difference in color density between two positionally different spots exceeds a predetermined value, thereby determining first spots having a larger color density difference as belonging to an image region and second spots having a lesser color density difference as belonging to a background region, and extracting at least one of the regions without operator intervention, and
   (c) determining an exposure amount for subsequent copying based on a characteristic quantity of the extracted region.

2. The method of claim 1 wherein steps (a) and (b) include
   scanning the surface of the original with light through a slit to continuously measure the density of a series of scanning spots, and
   determining whether or not the difference in color density between every two adjoining scanning spots exceeds a predetermined value, thereby determining whether the respective spots belong to an image region or a background region.

3. The method of claim 2 wherein a plurality of photometric sensors having different color sensitivity are used for photometeric measurement, and every two adjoining scanning spots are determined to belong to the image region when the difference in color density therebetween exceeds the range of 0.01 to 0.06 as measured by at least one of the sensors.

4. A method for controlling an exposure amount in copying of a color original, comprising the steps of:
   (a) photometrically measuring a color density or another value corresponding thereto on the surface of the original from its reflected image,
   (b) selecting ranges of low and high level measurements from the measurements, thereby determining that the ranges of low and high measurements belong to an image region and that the ranges of intermediate level measurements belong to a background region and extracting at least one of the regions without operator intervention, and
   (c) determining an exposure amount for subsequent copying based on a characteristic quantity of the extracted region.

5. The method of claim 4 wherein step (b) further includes
   determining whether or not the difference in color density between two positionally different photometrically measured spots exceeds a predetermined value, with the result being added to the determination of step (b).

6. The method of claim 4 wherein step (b) includes
   determining a region having densities higher than Dmin by 0.01–0.20 and a region having densities lower than Dmax by 0.05–0.50 to be the background region wherein Dmax and Dmin are maximum and minimum densities which are previously set or photometrically measured in step (a).

7. The method of any one of claims 1 to 4 wherein the image region is extracted, and the characteristic quantity is a function of at least one density selected from an average density, maximum density, minimum density, and a density determined on the basis of a density histogram among photometrically measured densities of the image region.

8. The method of claim 7 wherein the characteristic quantity contains a correction factor associated with a predominant image portion of the color original.

9. The method of any one of claim 1 which further comprises, prior to step (a), the steps of:
   (i) photometrically measuring a reflective density of a test chart,
   (ii) producing a copy of the test chart,
   (iii) photometrically measuring a reflective density of the test chart copy, and
   (iv) computing image reproduction data from the photometric measurements of reflective density of the test chart and the test chart copy,
   wherein in step (c) the exposure amount for subsequent copying is determined from the characteristic quantity of the extracted region, the image reproduction data obtained in step (iv), and previously set image control data.

10. The method of claim 1 or 4 wherein
    step (b) includes extracting both said image and background regions, and step (c) includes determining an exposure amount for subsequent copying based on characteristic quantities of both said extracted regions.

11. The method of claim 1 or 4 wherein step (c) includes controlling the exposure amount for copying by using image control characteristic data representative of the relationship between the reflected image of the color original and the color copy density, and image reproduction characteristic data previously obatined from an actually copied image.

* * * * *